United States Patent
Grenfell

(10) Patent No.: US 10,650,569 B2
(45) Date of Patent: May 12, 2020

(54) BROWSER-BASED TEXTURE MAP GENERATION AND APPLICATION

(71) Applicant: ADOBE INC., San Jose, CA (US)

(72) Inventor: Desmond Trevor Thomas Grenfell, Rossendale (GB)

(73) Assignee: Adobe Inc., San Jose, CA (US)

( * ) Notice: Subject to any disclaimer, the term of this patent is extended or adjusted under 35 U.S.C. 154(b) by 484 days.

(21) Appl. No.: 14/830,054

(22) Filed: Aug. 19, 2015

(65) Prior Publication Data
US 2017/0053431 A1    Feb. 23, 2017

(51) Int. Cl.
G06T 15/04    (2011.01)
G06T 11/00    (2006.01)

(52) U.S. Cl.
CPC ............ G06T 15/04 (2013.01); G06T 11/001 (2013.01); G06T 2210/16 (2013.01)

(58) Field of Classification Search
None
See application file for complete search history.

(56) References Cited

U.S. PATENT DOCUMENTS

| | | | | |
|---|---|---|---|---|
| 6,996,287 B1* | 2/2006 | Weiss | ........................ | G06T 5/50 345/582 |
| 8,174,539 B1* | 5/2012 | Samaniego | ............. | G06T 15/04 345/418 |
| 9,472,161 B1* | 10/2016 | Ho | ........................... | G09G 5/02 |
| 2008/0068377 A1* | 3/2008 | Lindbloom | ........... | G06T 11/001 345/426 |

\* cited by examiner

*Primary Examiner* — Sarah Le
(74) *Attorney, Agent, or Firm* — Shook, Hardy & Bacon, L.L.P.

(57) ABSTRACT

Techniques are provided for utilizing a browser-based texture map generator to generate texture maps for images containing objects that are available in multiple textures. An image that contains objects that are capable of retexturing is received. Utilizing a browser-based image editing application, the objects are segmented from the image and shading is separated from texture for the objects. A WebGL-based texture mapping tool is applied to create a texture map for at least a portion of the objects. A two-dimensional vignette of the object(s) is generated containing the data needed to re-texture each segmented object.

17 Claims, 7 Drawing Sheets

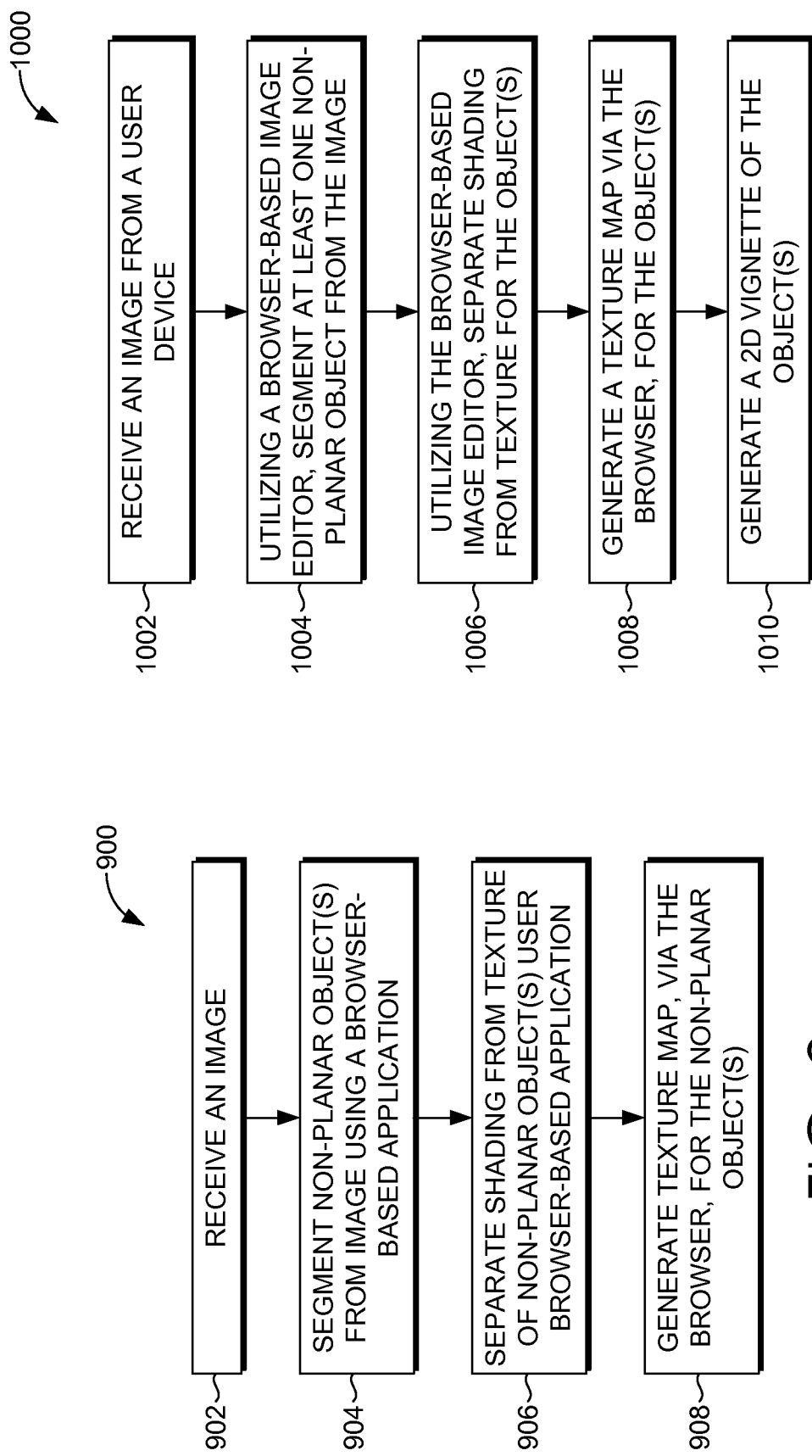

BROWSER-BASED TEXTURE MAP GENERATION AND APPLICATION

BACKGROUND

Product providers often utilize visual configurators to allow their customers to view available products in a variety of offered product configurations. Visual configurators allow shoppers to explore a range of configurations (combinations of arrangements, colors and textures) in which a product is available without requiring a provider of such products to explicitly provide digital assets for each of the numerous available combinations. For instance, suppose a particular company has automobiles for sale that are available in a plethora of exterior colors and with multiple different interiors, wheel types, trim, and the like. As the number of available options and options configurations increases, the task for the company would become increasingly difficult and labor-intensive if it was necessary to provide an image of each and every options configuration available. Not providing an image of all available configurations, however, may cost the company sales as users often want to view a visual image of exactly what they are purchasing before making the decision to buy. Visual configurators permit a product provider, rather than providing an image of each possible options configuration, to provide a limited number of images of the product along with images of the available options (e.g., color swatches) that are not applied to product images. Visual configurators are designed to composite product images with images of available options and to deliver a single customized image having a desired options configuration.

Cases where products are available in multiple textures present a challenging situation for visual configurators. Suppose, for instance, that rather than cars, a company sells soft furnishings or apparel items that are available not only in fabrics of different colors but also in fabrics of different textures. Generating convincing and authentic visualizations of the resultant product configurations is more challenging in this case as simply applying a textural pattern to an object without regard for the geometric distortions caused by viewing a three-dimensional object in two dimensions results in physically unrealistic images.

Specialized desktop visual configuration software is available that permits generation of texture maps that simulate the three-dimensionality of an object and the resultant distortion of applied textures. Applying a texture map to an object and compositing it with an image of a desired texture permits warping of the textural image which generates a realistic looking output image of the object with the texture applied. Such specialized desktop visual configuration software is generally expensive, requires specialized skill to utilize, applies to limited platforms, and is available only on a device on which it is installed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to techniques for utilizing a browser-based texture map generator to generate texture maps for images containing objects that are available in multiple textures and to apply such texture maps to the appropriate objects to create images in which the objects are shown having desired textures. This permits creation of digital assets for which multiple options configurations are available without the expense and specialized skill necessary for specialized desktop asset generation applications. It further permits digital assets to be created on any platform and on any computing device. A browser-based texture map generator in accordance with embodiments of the present invention allows an item provider (e.g., an online retail product provider) to access a cloud-based image compositing authoring instance through a browser via a configuration website. The item provider, utilizing a digital-asset authoring device, provides an image (e.g., a photographic image or a computer generated image) to the image compositing authoring instance. A browser-based image editing application, such as ADOBE PHOTOSHOP, is applied to the received image to segment the image into a series of objects, at least one such object being a non-planar object that is capable of being retextured. In instances where shading (i.e., slight variations or differences in color) is present in the at least one object, such shading is additionally separated from texture for the segmented at least one object.

A texture map of the at least one object is generated via the browser. More particularly, a WebGL-based texture map tool is utilized to access graphics functionality associated with the digital-asset-authoring device and, utilizing methods known to those of ordinary skill in the art, flow-lines are created for the at least one object. The flow-lines simulate a third dimension for the at least one object and permit warping of various regions of the object(s) in such a way that the geometry of the object(s) is represented in a physically realistic way when different textures are applied. Utilizing methods known to those of ordinary skill in the art, a texture map is generated for the at least one object from the flow-lines. In the texture map, a texture-coordinate is assigned to each pixel comprising the at least one object. This allows the pixels from the object image to be non-uniformly mapped to the pixels of another image (for instance, an image of a texture swatch); permitting all or some of the object image to appear as though it is re-textured. Thus, the flow-lines are modified in accordance with a three-dimensional representation of the at least one object to define the texture map.

BRIEF DESCRIPTION OF THE DRAWINGS

The present invention is described in detail below with reference to the attached drawing figures, wherein:

FIG. 9 is a flow diagram showing a method for generating texture maps for images containing non-planar objects in accordance with embodiments of the present invention;

FIG. 10 is a flow diagram showing another method for generating texture maps for images containing non-planar objects in accordance with embodiments of the present invention.

DETAILED DESCRIPTION

Figure 1:
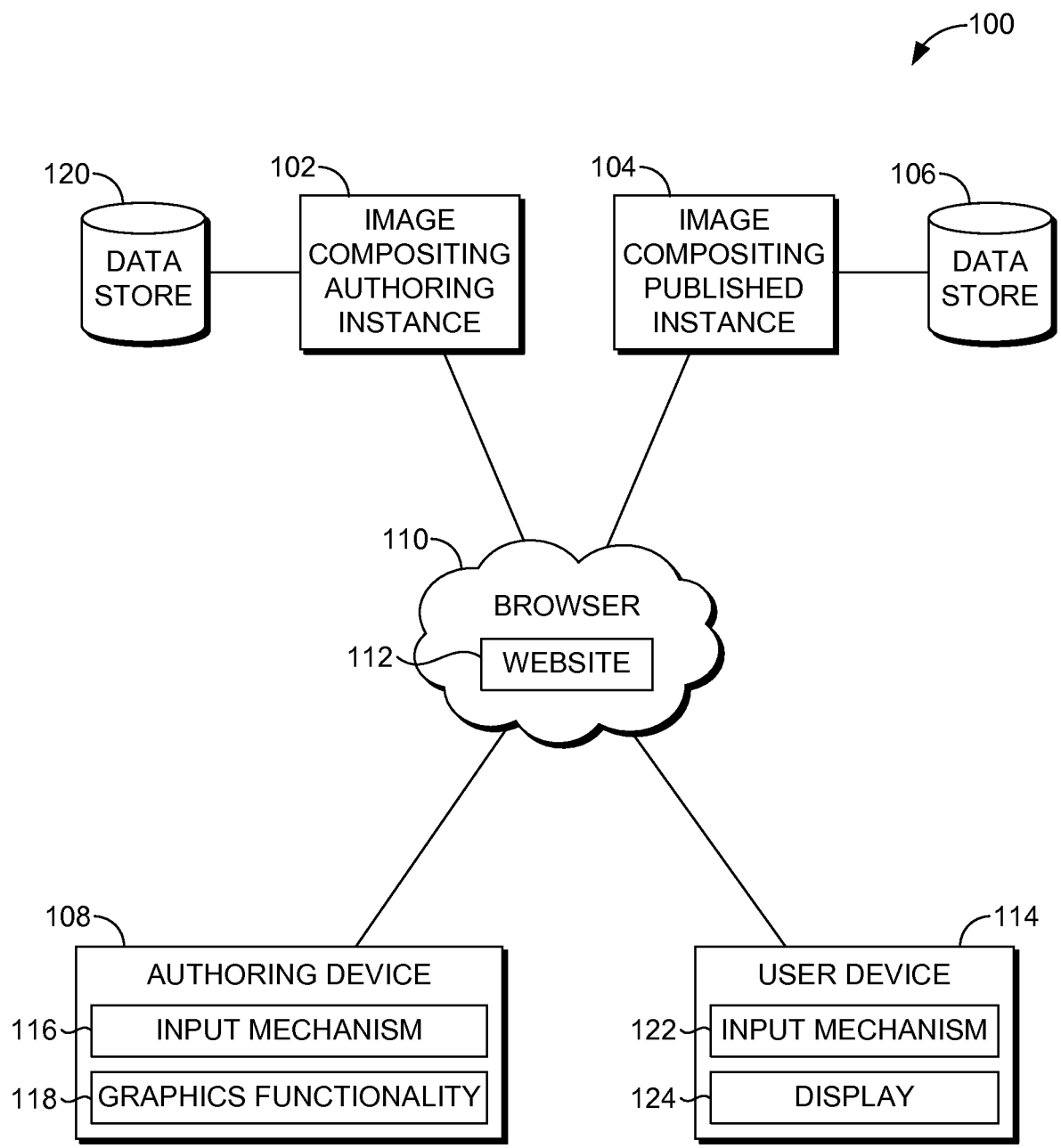
FIG. 1 is a block diagram showing a system for utilizing a browser-based texture map generator to generate and apply texture maps in accordance with an embodiment of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Descriptions of some terms are included below to provide a clearer understanding of the ideas disclosed herein:

"Flow-lines" refer to referential lines applied to an object image that may be modified in accordance with the three-dimensional geometry of the object to generate a texture map. "Flow-lines" are used to indicate the projection onto the object image, of lines which would run either horizontally or vertically within a non-distorted image of an applied texture. Upon application of an appropriate algorithm (known to those of ordinary skill in the art and, accordingly, not further described herein), flow-lines provide a mechanism for generating a texture-map that is represented in a resolution independent way.

"Graphics functionality" refers to any program that renders an associated computing device capable of presenting and manipulating images. As used herein, "graphics functionality" that is associated with a user device (e.g., a digital-asset-authoring device) is accessed utilizing a WebGL-based texture map tool, as understood by those having ordinary skill in the art.

An "object" or "object image" refers to a region or portion of an image to which multiple permutations may be applied. Generally, objects referred to herein, while presented in a two-dimensional image, are non-planar as they exist in the physical world and, accordingly, have three-dimensional geometries associated therewith.

An "option" refers to one of multiple alternatives that may be applied to an object. By way of example only, an "option" is a color selection, texture selection, part arrangement, or the like.

An "options configuration" refers to a selection of options to be applied to a single image, whether all applied to a single object or applied to multiple objects present in the image. That is, an "options configuration" is a combination of options desired for a particular item represented in an image. When the item is a product, "product configuration" is synonymous with "options configuration" as utilized herein.

"Shading" refers to variations, differences, or distortions in the color of an object. Such variations are present, by way of example only, due to differences in depth that result from displaying a three-dimensional object in two dimensions.

A "texture map" refers to an image-type object (i.e., a rectangular grid of data) which assigns a texture-coordinate to each pixel within an associated image. This in turn allows the pixels from one image to be non-uniformly mapped to the pixels of another image—allowing all or some of that image to be re-textured. A texture map permits the appearance of various textures being deformed in a convincing and authentic-looking way when applied to a two-dimensional image of an object that exists in three-dimensions in the physical world.

A "vignette" is a computer-based document that represents an authored image. The authoring process takes one or more regular images (e.g., derived from a digital camera or rendered from a three-dimensional model) and adds supplementary data which enable the image to be recolored, retextured, or reconfigured. The supplementary data consists of, by way of example only, a series of mask images which divides (i.e., segments) the initial image into a series of objects which can be individually retextured, recolored, or reconfigured; illumination images for each object of the series of objects which can be recolored or retextured; and/or texture maps for each of the illumination images which can be retextured. Thus, a "vignette" is an image-based document that is configured for compositing with other images to create resultant images having desired options and authentic visual characteristics. Thus, a "vignette" is an image-based document derived from a two-dimensional image of an object that exists in the physical world in three-dimensions, the vignette having information associated therewith (e.g., a texture map) that aids in compositing the image with other images into a realistic resultant image.

A "visual configurator" composites images of items (e.g., products) with images of available options (e.g., colors, textures, and the like) to deliver a single customized image having a desired options configuration.

Web-based visual configurators permit users (e.g., online shoppers) to explore a wide-range of configurations (combinations of arrangements, colors, textures, and the like) in which a particular item (e.g., product) is available without requiring the item provider (e.g., an online retail product provider) to explicitly provide digital assets for each of the myriad available combinations. For instance, a retailer may employ a web-based visual configurator to allow its customers to view available products in each arrangement, color and/or texture in which the product is available when a customer visits a product page at the retailer's website. Visual configurators are capable of synthesizing the available variations beginning with a photographic image or a computer-generated image. Computer-generated images often have associated three-dimensional and/or geometric data. However, when visual configurators synthesize various permutations from a photographic image, it is desirable to generate a three-dimensional representation of the object and simulate the object's geometry in the third dimension. In either case, realistic texture maps that reflect the three-dimensional and/or geometric data for those regions of products which can be retextured are needed for generating authentic and convincing images of products in different textures.

Embodiments of the present invention generally are directed to techniques for utilizing a browser-based texture map generator to generate texture maps for images containing objects that are available in multiple textures. Exemplary embodiments further are directed to compositing images utilizing generated texture maps such that different permutations of those regions of products that are capable of retexturing are viewable by a user. A browser-based texture map generator in accordance with embodiments of the present invention allows an item provider (e.g., online retailer or agent thereof), utilizing a digital-asset authoring device, to access a cloud-based image authoring instance through a browser via a configuration website. The item provider uploads an image (e.g., a photographic image) to the authoring instance. The item provider may be permitted access to the authoring instance utilizing any credential-based log-in functionality known to those having ordinary skill in the art. Once an image is uploaded, a browser-based image editing application, such as ADOBE PHOTOSHOP, is utilized to segment the image into a series of objects, at least one such object being a non-planar object that includes a first texture and that is capable of being retextured such that it instead includes a second texture. If shading is present in the non-planar object, the browser-based image editing application is utilized to separate the shading from the texture for the at least one object. The result is a layered file of the image that includes the at least one object. The image file is converted into a two-dimensional vignette utilizing a content management system, for instance, ADOBE EXPERIENCE MANAGER.

A texture map is generated for the at least one object, via the browser, from the two-dimensional vignette; that is, additional authoring data is added to the two-dimensional vignette, the additional authoring data including a texture map of the at least one object. More particularly, a WebGL-based texture map tool is utilized to access graphics functionality associated with the digital-asset-authoring device. Utilizing, at least in part, the accessed graphics functionality, a plurality of flow-lines is created for the at least one object. A third dimension is simulated for the at least one object creating a three-dimensional representation of the object(s) having the flow-lines applied. Techniques for simulating and estimating the three-dimensionality of non-planar objects from two-dimensional images are known to those of ordinary skill in the art and, accordingly, are not further described herein. As the flow-lines were first created when the at least one object was shown in two-dimensions, applying the flow-lines to the three-dimensional representation results in a representation with flow-lines distorted in accordance with the three-dimensional geometry of the representation. The flow-lines applied in accordance with the three-dimensional representation of the at least one object permit warping of various regions of a texture to be applied to the object(s) in such a way that the geometry of the texture is represented in a physically realistic way when applied to the object(s).

Utilizing methods known to those of ordinary skill in the art, a texture map is generated for the at least one object from the flow-lines applied in accordance with the three-dimensional representation of the at least one object. In the texture map, a texture-coordinate is assigned to each pixel comprising the object(s). This allows the pixels from the object image to be non-uniformly mapped to the pixels of another image (for instance, an image of a texture swatch); permitting all or some of the object(s) to appear as though they are re-textured. Thus, the flow-lines are modified in accordance with the three-dimensional representation to define the texture map. The texture map then is applied to the vignette (i.e., the texture map authoring data is added to the vignette) to create a modified vignette including the texture map data. This modified vignette is stored in association with the cloud-based image compositing authoring instance.

Users (for instance, retail customers) also have access to a cloud-based image compositor. When a user desires to view an item (e.g., a product) with one or more preferred textures applied, the user accesses the cloud-based image compositing published instance through a browser via the configuration website. The user is permitted to select an image having at least one object associated therewith that includes a plurality of available textural permutations. The user further is permitted to select from images of available textures that may be applied to the object(s). Upon selection of the desired image and desired texture, the modified vignette that includes the texture map associated therewith is composited with the image of the texture to provide to the user an image with the at least one object appearing to have the desired texture.

By generating texture maps utilizing a browser-based texture map generator, providers of items having multiple permutations are able to generate digital assets that permit a user to view items in each of a variety of available textures without using a desktop application. Accordingly, the digital assets may be created on any platform and on any computing device (e.g., desktop, laptop, notebook, mobile telephone, etc.). In those cases where there is graphics functionality associated with the device from which an authoring user is creating a digital asset, generating texture maps utilizing a browser-based texture map generator permits utilization of that functionality in combination with functionality provided by virtue of the cloud-based image editing application (s). Such can significantly decrease the costs and improve the cost-effectiveness of visual configurators, as well as decrease the need for a specialized skill set to generate digital assets for use by visual configurators.

Turning now to FIG. 1, a block diagram is provided illustrating an exemplary system 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 in FIG. 1 includes a cloud-based image compositing authoring instance 102 that is configured to, among other things, generate two-dimensional vignettes from images having non-planar objects included therein. The system 100 further includes a cloud-based image compositing published instance 104 that is configured to, among other things, composite images such that different permutations of details included in an image from which a two-dimensional vignette is generated may be altered. Broadly, the image compositing authoring instance 102 permits the creation of two-dimensional vignettes by a user of, for instance, the authoring device 108, which accesses the cloud-based image compositing authoring instance 102 through a browser 110 via a configuration web site 112. The image compositing published instance 104 broadly permits image compositing at the request of a user, for instance, a user of the user device 114 which accesses the cloud-based image compositing authoring instance 102 through a browser 110 via the same configuration website 112. The cloud-based image compositing authoring instance 102 and the cloud-based image compositing published instance 104 each is implemented via any type of computing device, such as computing device 1100 described below with reference to FIG. 11, for example. Each of the cloud-based image compositing authoring instance 102 and published instance 104 may be implemented on a single device or multiple devices cooperating in a distributed environment.

Figure 2:
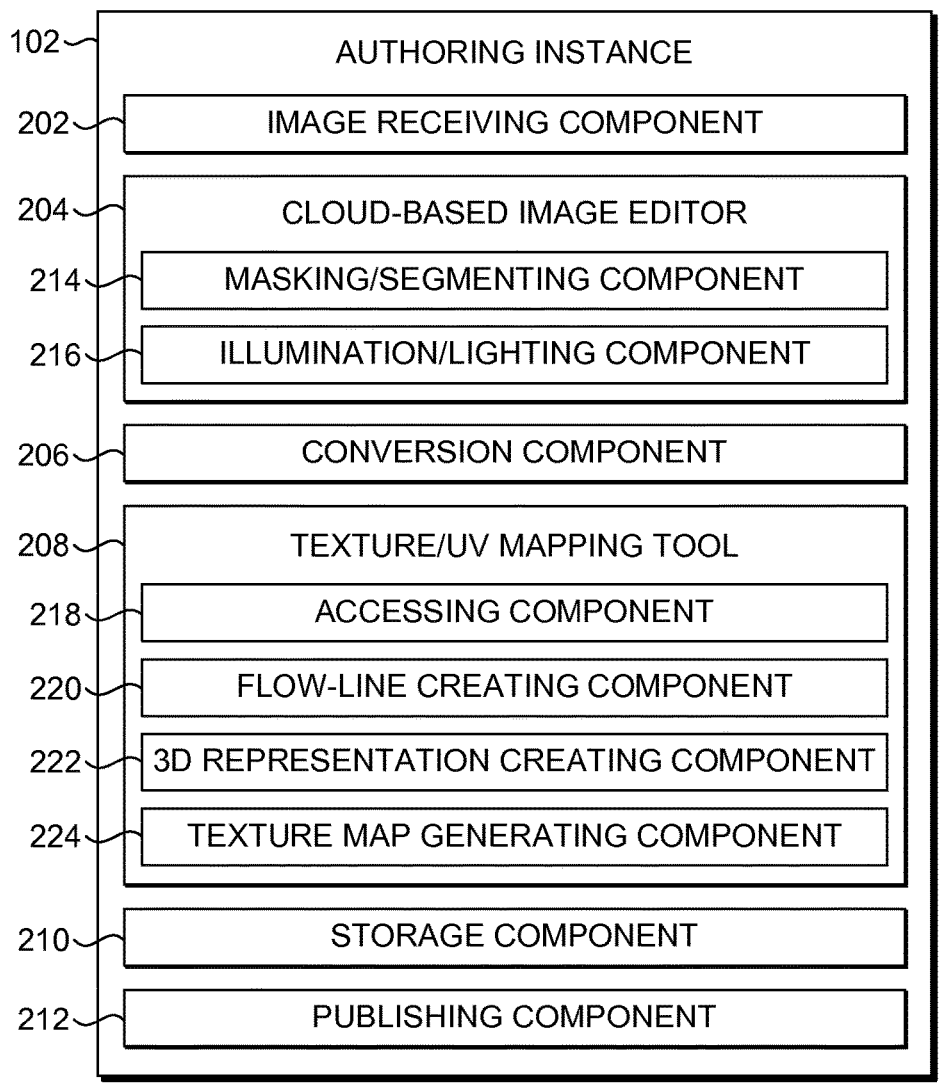
FIG. 2 is a diagram showing the cloud-based image compositing authoring instance of FIG. 1 in accordance with an embodiment of the present invention.

Referring to FIG. 2, the cloud-based image compositing authoring instance 102 is illustrated in greater detail. As previously stated, the authoring instance 102 permits the authoring of two-dimensional vignettes for use in compositing images having multiple options configurations. In this regard, the authoring instance 102 includes, an image receiving component 202, a cloud-based image editor 204, a conversion component 206, a texture/UV mapping tool 208, a storage component 210 and a publishing component 212. The image receiving component 202 is configured to receive item images (e.g., product images) provided by an authoring user. Received images generally include at least one non-planar object capable of being retextured. The images are received, by way of example only, from the authoring device 108 of FIG. 1. In this regard, an authoring user provides images via the input mechanism 116 associated with the device 108. Provided images may be photographic or computer-generated and are provided via uploading to the configuration website 112.

The cloud-based image editor 204 is any shared image editing application such as, by way of example only, ADOBE PHOTOSHOP, which is available on the authoring device 108. The cloud-based image editor 204 includes, at least, a masking or segmenting component 214 and an illumination/lighting component 216. The masking or segmenting component 214 is configured to segment or mask images into a series of objects. In embodiments, the masking or segmenting component 214 is configured to segment an image into a series of objects, at least one such object being a non-planar object. For instance, with reference to FIG. 4, the masking or segmenting component 214 may be configured to segment out the vest-like item of clothing 402 worn by the figure in the image 400.

The illumination/lighting component 216 is configured to separate shading and shadowing that occurs in objects from the textures included therein. For purposes of embodiments of the present invention, it is the texture of particular objects that is of interest. As such, the illumination/lighting component 216 is executed with respect to desired segmented objects such that the resultant image is a layered file (e.g., a layered PSD file) including the object or objects of interest. It will be understood and appreciated by those of ordinary skill in the art that the order of steps within the cloud-based image editor is not critical to embodiments of the present invention. For instance, shading may be separated from texture by the illumination/lighting component 216 for portions of or an entire received image prior to execution of masking or segmenting by the masking/segmenting component 214, if desired. Any and all such variations, and any combination thereof, are contemplated to be within the scope of embodiments hereof.

The conversion component 206 of the authoring instance 102 illustrated in FIG. 2 is configured to convert the layered file into a two-dimensional vignette, for instance, utilizing a content management system running through the browser 110. An exemplary content management system that may be used in implementing embodiments of the present invention is the ADOBE EXPERIENCE MANAGER.

The texture/UV mapping tool 208 of the authoring instance 102 of FIG. 2 is configured to generate a texture map, via the browser, from the two-dimensional vignette. In this regard, the texture mapping tool 208 includes an accessing component 218, a flow-line creating component 220, a three-dimensional representation creating component 222, and texture map generating component 224. In accordance with embodiments hereof, the texture/UV mapping tool 208 is a WebGL-based texture/UV mapping tool. As such, the accessing component 218 is configured to access graphics functionality 118 associated with the user device that authored the two-dimensional vignette (or the device that is being utilized to create the texture map, if different). The texture/UV mapping tool 208, at least in part, utilizing the accessed graphics functionality 118 of the user device creates a plurality of flow-lines for the object or objects of the two-dimensional vignette utilizing the flow-line creating component 220. With reference back to FIG. 4, vertical and horizontal flow lines for the vest-like article of clothing 402 are illustrated in a grid-like pattern and are designated as reference numeral 404.

Figure 5:
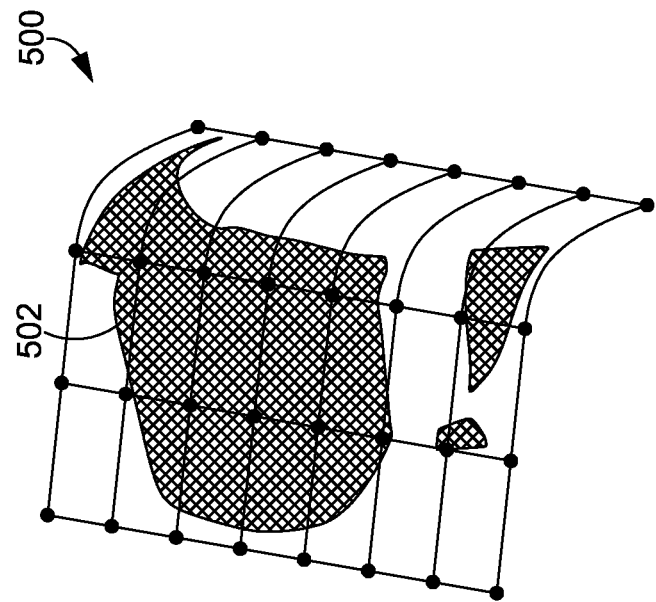
FIG. 5 is a schematic diagram showing a three-dimensional representation of the object of FIG. 4 in accordance with an embodiment of the present invention.
Figure 4:
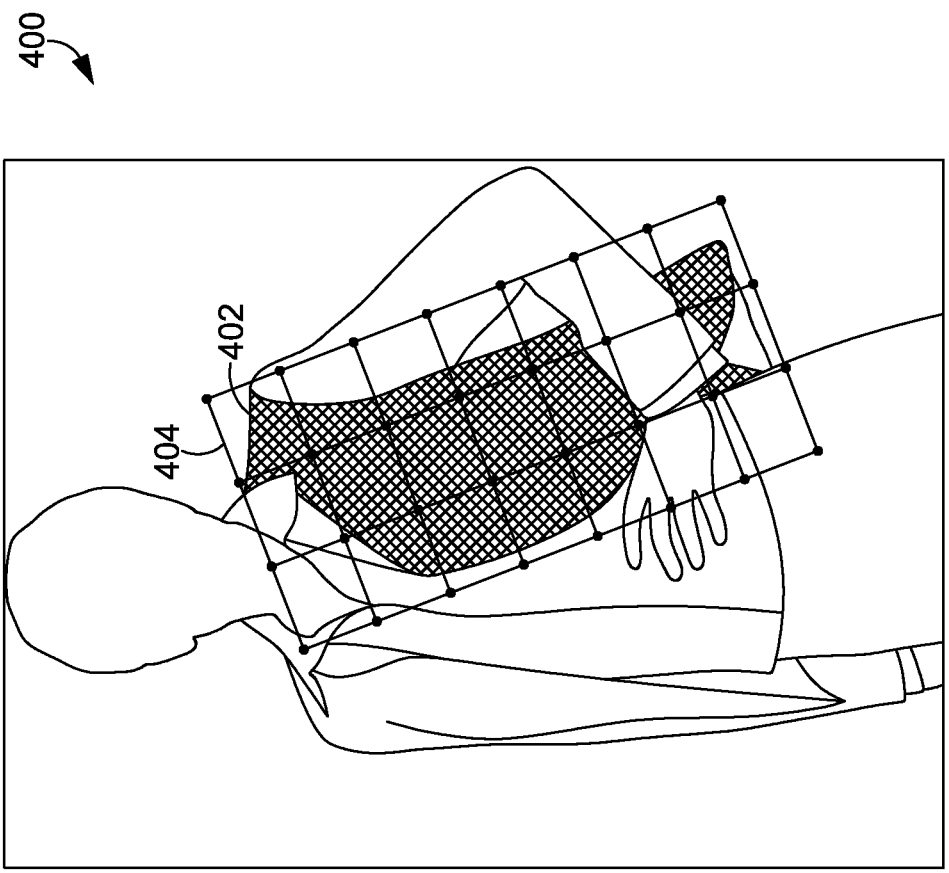
FIG. 4 is a schematic diagram showing a product image that includes an object to which multiple textures may be applied, the object having flow-lines, in accordance with an embodiment of the present invention.

The three-dimensional representation creating component 222 is configured to create a three-dimensional view of at least one object comprising the two-dimensional vignette; that is, objects which are capable of retexturing. In the case of a received image being a computer-generated image, three-dimensional and/or geometric data associated with the object(s) likely is included in the image file. However, where the received image is a photographic image, the three-dimensional representation creating component 222 is configured to create or generate a three-dimensional representation of the object(s) and simulate the geometry of the object(s) in the third dimension. Various techniques for simulating three-dimensional data from two-dimensional images are known to those of ordinary skill in the art and, accordingly, are not further described herein. An exemplary three-dimensional representation 500 of the vest-like item of clothing illustrated in FIG. 4 is shown in FIG. 5 and referred to generally as reference numeral 502.

Figures 6, 7:
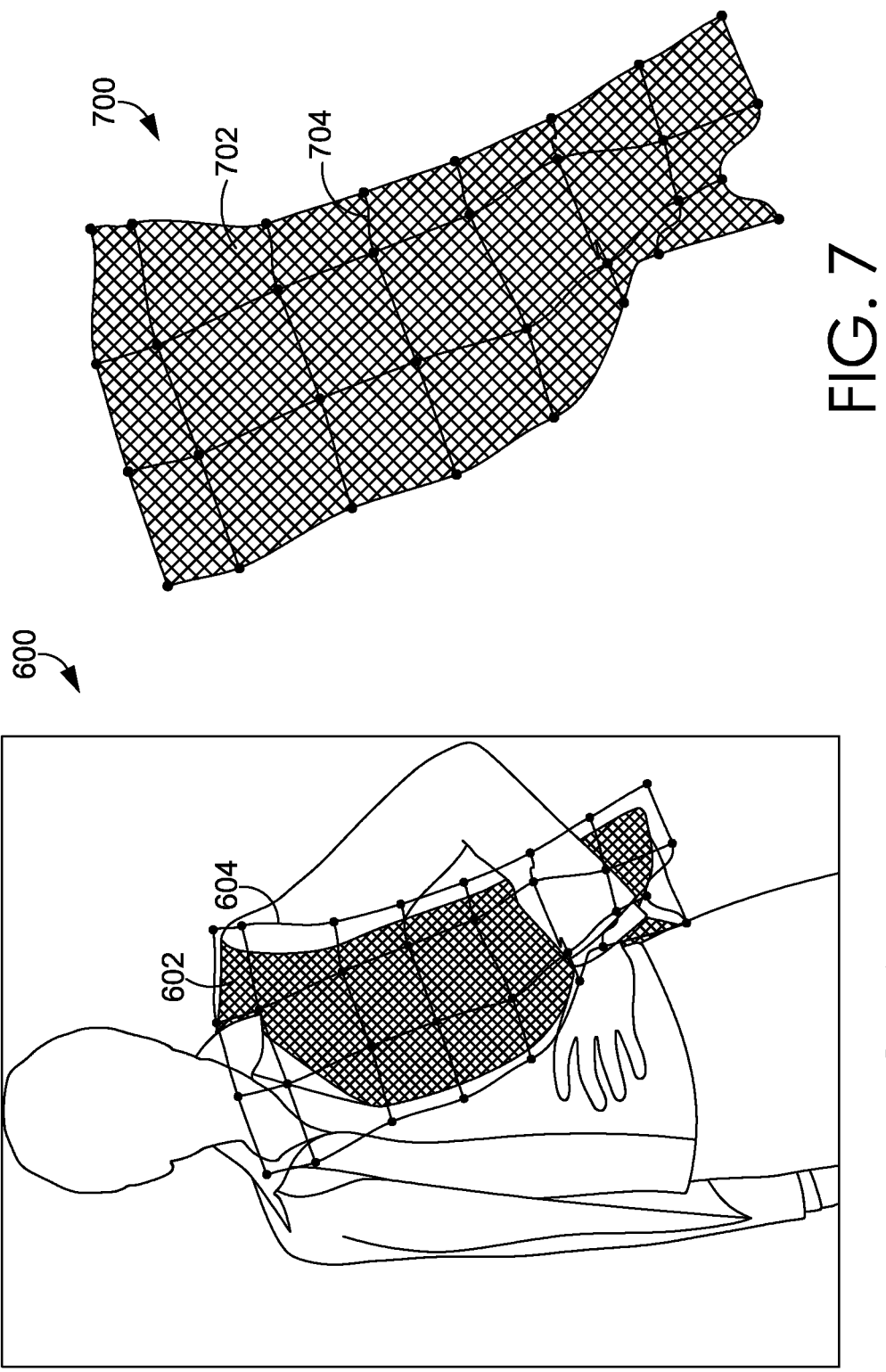
FIG. 6 is a schematic diagram showing the object of FIG. 4 with the flow-lines modified in accordance with the three-dimensional representation of FIG. 5 to create a texture map, the object shown associated with the product image, in accordance with an embodiment of the present invention.
FIG. 7 is a schematic diagram showing the object of FIG. 6 having the texture map applied thereto and absent association with the product image, in accordance with an embodiment of the present invention.

Thus, the texture map generating component 224 is configured to modify the flow-lines in accordance with the three-dimensional representation to define or generate a texture map. With reference to FIG. 6, the vest-like item 602 (previously shown in FIGS. 4 and 5) is illustrated with flow-lines 604 having been modified in accordance with the three-dimensional representation of FIG. 5. Note that the flow-lines 604 no longer comprise a uniform grid-like pattern but rather have been adjusted to mirror the likely three-dimensional nature of the object 602. With reference to FIG. 7, an image of the illustrated item of clothing 702 is shown having the flow-lines 704 applied thereto.

This image having modified flow-lines 704 is stored, utilizing the storage component 210 of FIG. 2, as a modified vignette; that is, a vignette having the additional texture map authoring data associated therewith. With reference back to FIG. 1, the cloud-based image compositing authoring instance 104 has access to a data store 120 configured to store, at least, two-dimensional vignettes and modified two-dimensional vignettes. The data store 120 further is configured to store images of options for objects of vignettes, as more fully described below. In embodiments, the data store 120 is configured to be searchable for one or more of the items stored in association therewith. It will be understood and appreciated by those of ordinary skill in the art that the information stored in association with the data store 120 may be configurable and may include any information relevant to, by way of example only, item (e.g., product) images, item vignettes, modified item vignettes, options associated with vignettes, and the like. The content and volume of such information are not intended to limit the scope of embodiments of the present invention in any way. Further, the data store 120 may be a single, independent component (as shown) or a plurality of storage devices, for instance, a database cluster, portions of which may reside in association with the cloud-based image compositing authoring instance 102, the authoring device 108, another external computing device (not shown), and/or any combination thereof.

Referring back to FIG. 2, the publishing component 212 of the authoring instance 102 is configured to publish the modified vignette for access via the cloud-based image compositing published instance 104 (FIG. 1).

In addition to item images (e.g., product images) provided by an authoring user, the image receiving component 202 of the authoring instance 102 is configured to receive images representing options that may be changed out for objects of various item images. For instance, such options include color swatches, scanned texture samples, and the like. Such images are received, by way of example only, from the authoring device 108 of FIG. 1. In this regard, an authoring user provides options images via the input mechanism 116 associated with the device 108. Provided images may be photographic or computer-generated and are provided via uploading to the configuration website 112. Options images are stored in association with the data store 118 (FIG. 1) and are published for access via the cloud-based image compositing published instance 104. The published instance 104 is more fully described below.

Figure 3:
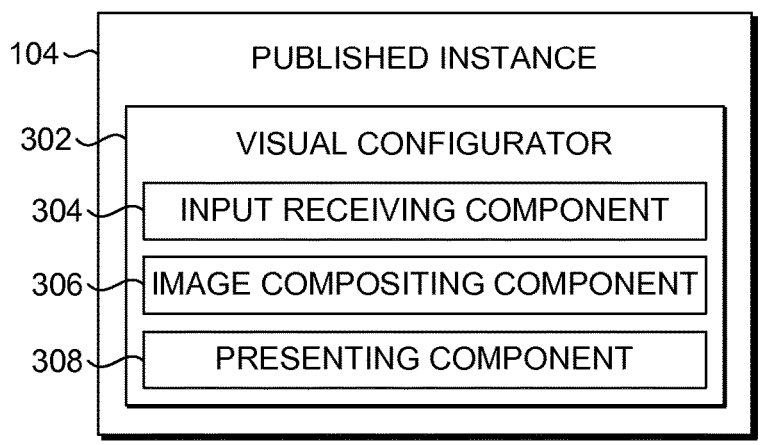
FIG. 3 is a block diagram showing the cloud-based image compositing published instance of FIG. 1 in accordance with an embodiment of the present invention.

With reference now to FIG. 3, the cloud-based image compositing published instance 104 of FIG. 1 is illustrated in greater detail. Generally, the image compositing authoring instance 102 and the image compositing published instance 104 reside within a different cloud/web-site, for instance, to protect the integrity of any entity associated with the authoring device 108 as the published instance 104 is accessible by public users. As previously stated, the published instance 104 permits image compositing at the request of a user, for instance, a user of the user device 114. In this regard, the published instance 104 includes a visual configurator 302. Broadly, the visual configurator 302 allows users to explore a range of configurations (combinations of arrangements, colors and textures) in which a product is available despite not having access to dedicated digital assets depicting every possible options configuration. The visual configurator 302 includes an input receiving component 304, an image compositing component 308, and a presenting component 310.

The input receiving component 304 is configured to receive user selection of items and of desired options to be applied to images of selected items. Such desired options include, by way of example only, colors, textures, patterns, and the like. With reference back to FIG. 1, the cloud-based image compositing published instance 104 has access to a data store 106 configured to store, at least, vignettes and modified vignettes. The data store 106 further is configured to store images of options for objects of vignettes. In embodiments, the data store 106 is configured to be searchable for one or more of the items stored in association therewith. It will be understood and appreciated by those of ordinary skill in the art that the information stored in association with the data store 106 may be configurable and may include any information relevant to, by way of example only, item (e.g., product) images, item vignettes, modified item vignettes, options associated with vignettes, and the like. The content and volume of such information are not intended to limit the scope of embodiments of the present invention in any way. Further, the data store 106 may be a single, independent component (as shown) or a plurality of storage devices, for instance, a database cluster, portions of which may reside in association with the cloud-based image compositing published instance 104, the authoring device 108, another external computing device (not shown), and/or any combination thereof.

Desired options are generally selected from visual indicators of available options that are displayed in association with a default or standard image of a selected item. In this regard, a user provides the desired input via the input mechanism 122 associated with the user device 114 of FIG. 1. The input mechanism 122 includes, by way of example only, an I/O component (such as a stylus or keypad). Alternatively or additionally, the input mechanism 122 may include a UI presented on the display 124 and permitting alpha-numeric, textual, and/or touch input. Any and all such variations, and any combination thereof, are contemplated to be within the scope of embodiments of the present invention.

Upon selection of a desired product image and desired options to be applied to the image, at least one of the options comprising a desired textural selection, the image compositing published instance 104, utilizing the image compositing component 306, composites a modified vignette that includes associated therewith a texture map of the object or objects to which a desired textural selection is to be applied, with an image of the desired texture or textures to provide to the user an image with the object(s) having the desired texture(s). The presenting component 308 is configured to present, for instance, in association with the display 124 of the user device 114 of FIG. 1, an image with the object (or objects) being shown in the desired texture(s).

Figure 8:
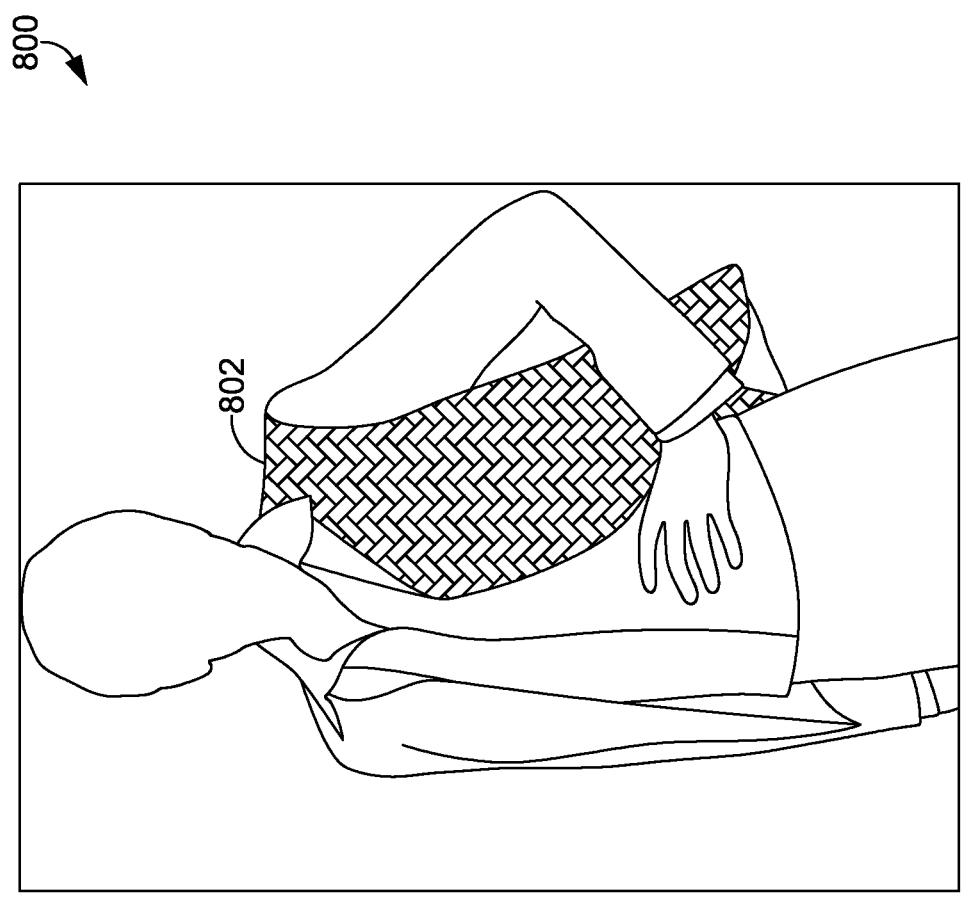
FIG. 8 is a schematic diagram showing a product image with the object of FIG. 4 being illustrated in a different texture and in accordance with the texture map, in accordance with an embodiment of the present invention.

With reference to FIG. 8, an image is illustrated with the vest-like item of clothing 802 shown in FIGS. 4-7 illustrated with a different texture applied thereto. In accordance with embodiments hereof, such image 800 was generated utilizing the modified two-dimensional vignette 700 of FIG. 7 composited with a product image (e.g., the product image 400 of FIG. 4 absent the flow-lines) and a swatch or image sample of the desired texture.

Turning now to FIG. 9, a flow diagram is provided that illustrates an exemplary method 900 for generating a texture map for images containing one or more non-planar objects, in accordance with an embodiment of the present invention. Each block of the method 900 comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 900 may be provided as part of a texture mapping tool, such as the texture mapping tool 208 of FIG. 2.

Initially, as shown at block 902, an image is received from a user device (e.g., the authoring device 108 of FIG. 1). For instance, an image of a product that has at least one region or object available with a variety of different options configurations (colors, textures, etc.) may be uploaded by the authoring device 108. As shown at block 904, utilizing a browser-based image editing application (e.g., ADOBE PHOTOSHOP), at least one non-planar object is segmented from the image. Also utilizing a browser-based image editing application (which may be the same or different from the image editing application configured to segment the image), shading is separated from texture for the at least one non-planar object, as shown at block 906.

As shown at block 908, a texture map is generated, via the browser, for the at least one non-planar object. Though not illustrated in FIG. 9, in accordance with embodiments of the present invention, such texture map is generated by accessing graphics functionality associated with the user device, utilizing the graphics functionality, creating flow-lines for the at least one non-planar object and a three-dimensional representation of the object(s) having the flow-lines applied thereto, and modifying the flow-lines in accordance with the three-dimensional representation to create a texture map defined by the flow-lines. The generated texture map is then stored, as desired, for use in compositing images with desired options configurations.

Referring now to FIG. 10, a flow diagram is provided that illustrates another exemplary method 1000 for generating a texture map for images containing one or more non-planar objects. Each block of the method 1000 comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 1000 may be provided as part of a texture mapping tool, such as the texture mapping tool 208 of FIG. 2.

Initially, as shown at block 1002, an image is received from a user device (e.g., the authoring device 108 of FIG. 1). For instance, a photographic or computer-generated image of a product that has at least one region or object available in a variety of different options (colors, textures, etc.) is uploaded by the authoring device 108. As shown at block 1004, utilizing a browser-based image editing application (e.g., ADOBE PHOTOSHOP), at least one non-planar object is segmented from the image. Also utilizing a browser-based image editing application (which may be the same or different from the image editing application configured to segment the image), shading is separated from texture for the non-planar object(s), as shown at block 1006.

As shown at block 1008, a texture map is generated, via the browser, for the non-planar object(s). Though not illustrated in FIG. 10, in accordance with embodiments of the present invention, such texture map is generated by accessing graphics functionality associated with the user device, utilizing the graphics functionality, creating flow-lines for the non-planar object(s) and a three-dimensional representation of the object(s) having the flow-lines applied thereto, and modifying the flow-lines in accordance with the three-dimensional representation to create a texture map defined by the flow-lines. A two-dimensional vignette is generated 1010, that includes the texture map as a portion of the authoring data. Thus, the two-dimensional "vignette" refers to the entire document containing the original image together with generated or derived image-based data for non-planar object(s). The object data may include, by way of example only, segmenting images (i.e., masks), illumination images, and texture maps (as derived from the user-defined flow lines). A master vignette is created on the authoring instance 102 (FIG. 1) and a reduced vignette is published on the published instance 104 which contains just those data needed to re-texture the image (which may not include the flow-lines).

Figure 11:
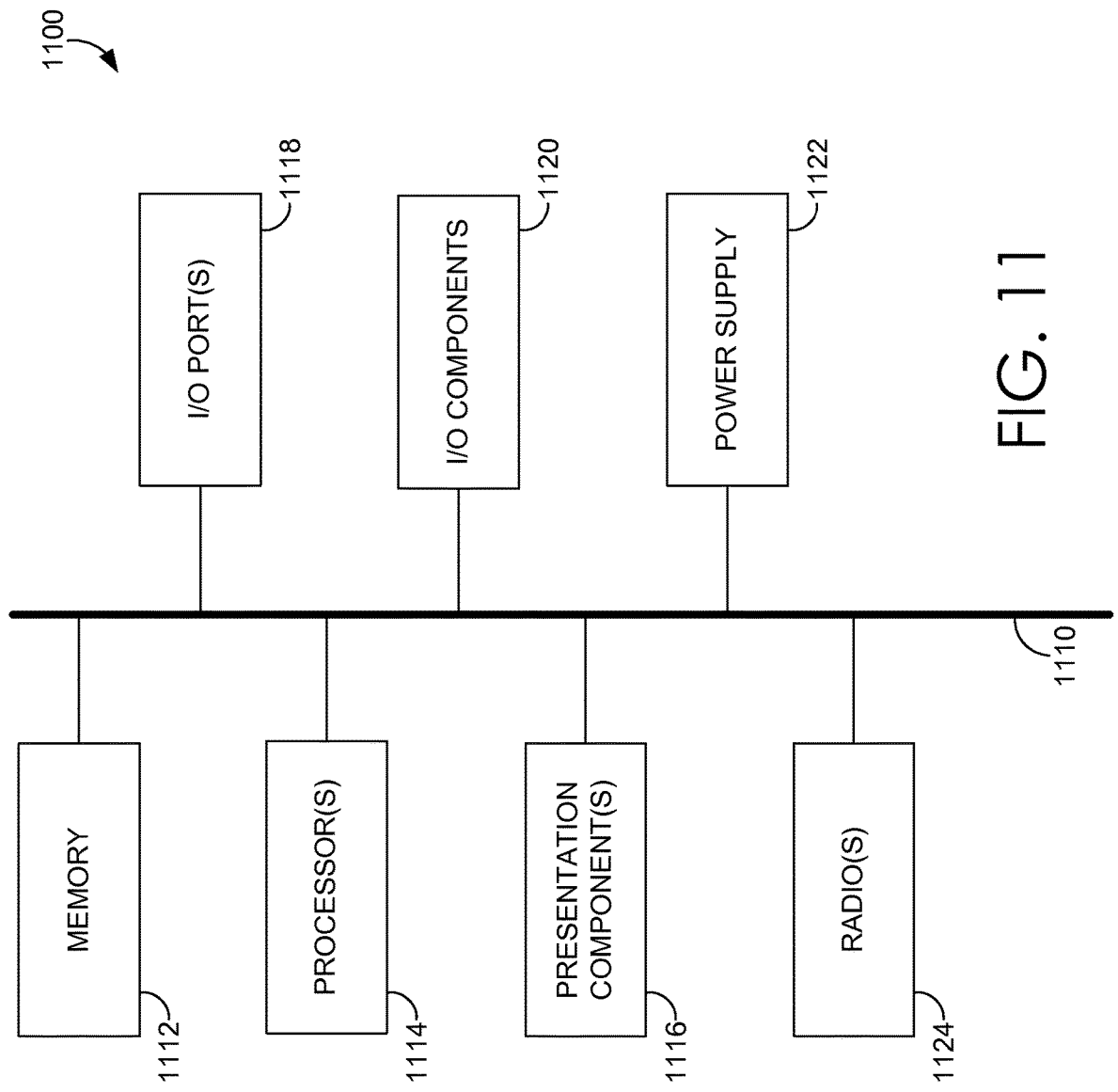
FIG. 11 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, the computing device 1100 includes a bus 1110 that directly or indirectly couples the following devices: memory 1112, one or more processors 1114, one or more presentation components 1116, input/output (I/O) ports 1118, input/output components 1120, and an illustrative power supply 1122. The bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

The computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1112 includes computer-storage media in the form of volatile and/or nonvolatile memory. The memory may be removable, non-removable, or a combination thereof. Exemplary hardware devices include solid-state memory, hard drives, optical-disc drives, etc. The computing device 1100 includes one or more processors that read data from various entities such as the memory 1112 or the I/O components 1120. The presentation component(s) 1116 present data indications to a user or other device. Exemplary presentation components include a display device, speaker, printing component, vibrating component, etc.

The I/O ports 1118 allow the computing device 1100 to be logically coupled to other devices including the I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As can be understood, embodiments of the present invention are generally directed to techniques for utilizing a browser-based texture map generator to generate texture maps for images containing objects that are capable of retexturing. Embodiments are further directed to compositing images utilizing generated texture maps such that different permutations of those regions of products that are capable of retexturing are viewable by a user. Embodiments hereof permit providers of items having multiple permutations to generate digital assets that permit a user to view items in each of a variety of available textures without using a desktop application. Accordingly, the digital assets may be created on any platform and on any computing device (e.g., desktop, laptop, notebook, mobile telephone, etc.).

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   receiving an image from a digital-asset authoring device;
   utilizing at least one cloud-based image editing application, segmenting at least one non-planar object from the image, the at least one non-planar object including a texture and shading;
   utilizing the at least one cloud-based image editing application, separating the shading from the texture for the at least one non-planar object;
   accessing graphics functionality provided by the digital-asset authoring device via a WebGL-based texture map tool; and
   at least in part utilizing the graphics functionality provided by the digital-asset authoring device, generating a texture map for the at least one non-planar object by:
   (1) creating a plurality of flow-lines for the at least one non-planar object;
   (2) creating a three-dimensional representation of the at least one non-planar object; and
   (3) modifying at least a portion of the plurality of flow-lines in accordance with the three-dimensional representation, the modified flow-lines defining the texture map.

2. The one or more computer storage media of claim 1, wherein the received image is one of a photograph and a computer-generated image.

3. The one or more computer storage media of claim 1, wherein the operations further comprise storing a two-dimensional vignette of the at least one non-planar object having the texture map applied thereto.

4. The one or more computer storage media of claim 3, wherein the operations further comprise:

receiving an image of a sample texture to be applied to the at least one non-planar object; and compositing the image of the sample texture with the at least one non-planar object having the texture map applied thereto to generate a composited image of the at least one non-planar object that has the sample texture.

5. The one or more computer storage media of claim 4, wherein compositing the image of the sample texture with the at least one non-planar object having the texture map applied thereto comprises:

assigning a texture-coordinate to each of a plurality of pixels comprising the at least one non-planar object in accordance with the texture map; and mapping a plurality of pixels comprising the sample texture to the plurality of pixels comprising the at least one non-planar object to generate a composited image of the at least one non-planar object that has the sample texture.

6. A computerized system comprising:

a cloud-based image compositing authoring instance having one or more processors and one or more computer storage media;

at least a first data store coupled with the cloud-based image compositing authoring instance;

a cloud-based image compositing published instance having one or more processors and one or more computer storage media; and at least a second data store coupled with the cloud-based image compositing published instance, wherein the authoring instance includes:

(1) an image receiving component that receives an image from a digital-asset authoring device;

(2) a cloud-based image editor that segments at least one non-planar object from the received image and separates shading from texture for the at least one non-planar object; and (3) a texture mapping tool that generates a texture map for the at least one non-planar object by:

a) accessing graphics functionality provided by the digital-asset authoring device utilizing a WebGL-based texture map tool;

b) creating a plurality of flow-lines for the at least one non-planar object, at least in part, using the accessed graphics functionality provided by the digital-asset authoring device;

c) generating a three-dimensional representation of the at least one non-planar object; and d) modifying the flow-lines in accordance with the three-dimensional representation, the modified flow-lines defining the texture map.

7. The computerized system of claim 6, wherein the received image is a photograph.

8. The computerized system of claim 6, wherein the received image is a computer generated image.

9. The computerized system of claim 6, wherein the authoring instance further includes a storage component that stores a two-dimensional vignette including the at least one non-planar object with the texture map applied thereto.

10. The computerized system of claim 9, wherein the authoring instance further includes a publishing component that publishes the two-dimensional vignette including the at least one non-planar object to the cloud-based image compositing published instance.

11. The computerized system of claim 10, wherein the image receiving component of the cloud-based image compositing authoring instance receives an image of a sample texture to be applied to the at least one non-planar object, and wherein the publishing component publishes the image of the sample texture to the cloud-based image compositing published instance.

12. The computerized system of claim 11, wherein the cloud-based image compositing published instance comprises a visual configurator that:

receives user input requesting a view of the image with the at least one non-planar object having the sample texture;

composites the two-dimensional vignette of the at least one non-planar object with the texture map applied thereto with the image of the sample texture to create a composited image with the at least one non-planar object having the sample texture; and transmits the composited image for presentation.

13. A computerized method for generating a texture map for images containing non-planar objects, the computerized method comprising:

receiving an image from a digital-asset authoring device;

utilizing at least one cloud-based image editing application, segmenting at least one non-planar object from the image;

utilizing the at least one cloud-based image editing application, separating shading from texture for the at least one non-planar object;

accessing graphics functionality provided by the digital-asset authoring device via a WebGL-based texture map tool; and at least in part utilizing the graphics functionality provided by the digital-asset authoring device, generating a texture map for the at least one non-planar object by:

(1) creating a plurality of flow-lines for the at least one non-planar object;

(2) creating a three-dimensional representation of the at least one non-planar object; and (3) modifying at least a portion of the plurality of flow-lines in accordance with the three-dimensional representation, the modified flow-lines defining the texture map; and generating a two-dimensional vignette including the segmented non-planar object that has the shading and texture separated therefrom.

14. The computerized method of claim 13, wherein the received image is a photograph.

15. The computerized method of claim 13, wherein the received image is a computer generated image.

16. The computerized method of claim 13, wherein the method further comprises storing a modified two-dimensional vignette of the at least one non-planar object having the texture map applied thereto.

17. The computerized method of claim 16, wherein the operations further comprise:

receiving an image of a sample texture to be applied to the at least one non-planar object; and compositing the image of the sample texture with the modified two-dimensional vignette of the at least one non-planar object having the texture map applied thereto to generate a composited image of the at least one non-planar object that has the sample texture.

* * * * *